United States Patent [19]
Hu et al.

[11] Patent Number: 5,491,764
[45] Date of Patent: Feb. 13, 1996

[54] NARROWBAND TWISTED OPTICAL FIBER WAVELENGTH DIVISION MULTIPLEXER

[75] Inventors: Andong Hu, San Diego; Douglas P. Bonnell, Vista, both of Calif.

[73] Assignee: Tacan Corporation, Carlsbad, Calif.

[21] Appl. No.: 251,086

[22] Filed: May 31, 1994

[51] Int. Cl.$^6$ .................................................. G02B 6/287
[52] U.S. Cl. ................................. 385/24; 385/43; 385/51
[58] Field of Search ............................ 385/24, 27, 39, 385/42, 43, 46, 50, 51

[56] References Cited

U.S. PATENT DOCUMENTS

| | | | |
|---|---|---|---|
| 4,483,582 | 11/1984 | Sheem | 385/24 |
| 4,591,372 | 5/1986 | Bricheno et al. | 385/51 X |
| 4,775,209 | 10/1988 | Stewart | 385/39 |
| 4,834,481 | 5/1989 | Lawson et al. | 385/44 |
| 4,932,742 | 6/1990 | Tohme | 359/124 |
| 5,121,453 | 6/1992 | Orazi et al. | 385/51 |
| 5,150,439 | 9/1992 | Hill et al. | 385/39 |
| 5,170,451 | 12/1992 | Ohshima | 385/43 |
| 5,408,555 | 4/1995 | Fielding et al. | 385/43 |

OTHER PUBLICATIONS

Multichannel Wavelength Multiplexing in Single Mode Optical Fibers (P. M. Kopera, K. L. Sweeney and K. M. Schmidt), SPIE vol. 839, Components for Fiber Optic Applications II (1987), pp. 25–30. (No Month).

Recent Advances in Fiber Optic Coupler Technology (Michael Corke, Kevin L. Sweeney and Kevin M. Schmidt), SPIE. vol. 722, Components for Fiber Optic Applications (1986), pp. 2–10. (No Month).

Primary Examiner—John D. Lee
Attorney, Agent, or Firm—Brown, Martin, Haller & McClain

[57] ABSTRACT

A narrowband twisted optical fiber wavelength division multiplexer ("WDM") and a method for fabricating the WDM. The WDM includes a twisted pair of first and second optical fibers that are fused together, each of the first and second fibers having a first and second end. In the WDM, when a first and second light are applied to the first end of the first fiber, they will appear on the second end of the first fiber and the second end of the second fiber, respectively. When the first light enters the second end of the first fiber, and the second light is applied to the second end of the second fiber, they will both appear on the first end of the first fiber.

24 Claims, 3 Drawing Sheets

NARROWBAND TWISTED OPTICAL FIBER WAVELENGTH DIVISION MULTIPLEXER

BACKGROUND OF THE INVENTION

1. Field of the Invention

The present invention relates to multiplexers and demultiplexers for fiber optic networks. More particularly, the invention relates to a narrowband optical fiber wavelength division multiplexer/demultiplexer using twisted and fused optical fibers for enhancing fiber optic system design and flexibility.

2. Description of Related Art

Fiber optic wavelength-division multiplexers ("WDMs") have become one of the key components in all optical fiber systems. The reason for this is that WDMs enhance system design and flexibility, as they permit more signals to be transmitted and received over a single optical fiber. Some of the major advantages of WDM fiber optic systems are: (1) increasing transmission capacity per fiber, (2) reducing cost of the system, and (3) expanding channel services after installation of the optical fibers. As a result, WDMs are widely applied in various fields of optical fiber networks and systems.

WDMs function to multiplex ("MUX") and demultiplex ("DEMUX") the optical signals. There are two basic WDM systems in the field: uni-directional and bi-directional. In the uni-directional system, WDMs are used to MUX the signals at the transmission end, while DEMUXing the signals at the receiving end. In bi-directional systems, WDMs are used to MUX and DEMUX the signals at both the transmitting and receiving ends.

There presently exist fiber optic WDMs that use fused pairs of optical fibers aligned in parallel with one another. Such WDMs are capable of MUXing and DEMUXing two preselected wavelength lights, operating at wavelengths of 1310 nanometers ("nm") and 1550 nm. In these WDMs, two optical fibers are aligned in parallel and simultaneously fused together while being heated. The resultant fused optical fibers form a fiber optic coupler.

In parallel fiber fused WDMs, however, the optical fibers are not twisted. Absent twisting, when the parallel optical fibers are pulled apart while being heated in order to fuse them, a force must be applied to urge the fibers toward one another. Such WDMs thus require a machine or device to force the two fibers together during the fusing process, adding expense to the fabrication process. Furthermore, previous WDMs, such as parallel fused optical fiber couplers, have failed to accomplish MUXing/DEMUXing of lights having closely spaced wavelengths (i.e., narrowband MUXing/DEMUXing) with adequate isolation between the wavelengths in the 1500 to 1600 nm range. Erbium-doped amplifiers operate in this range. As a consequence, previous fused WDMs have not been suitable for use in a narrowband optical fiber network employing Erbium-doped amplifiers.

Other existing WDMs include grating or multilayer dielectric thin film filters. Such WDMs use lenses and filters to attain the MUX and DEMUX functions. These WDMs, however, are expensive because they incorporate an assembly of separately fabricated parts, and they are not as flexible nor as small as fused optical fiber WDMs. Moreover, they are not as reliable as fused WDMs. A prism can also be used for WDM, but practical realization is hampered by low dispersion.

Therefore, a need exists for a twisted optical fiber narrowband WDM that is inexpensive and reliable and can operate to MUX and DEMUX optical signals at narrow bandwidths.

SUMMARY OF THE INVENTION

Accordingly, the present invention is directed to a twisted fiber narrowband WDM that substantially obviates one or more of the problems due to limitations and disadvantages of the related art.

Additional features and advantages of the invention will be set forth in the description that follows, and in part will be apparent from the description, or may be learned by practice of the invention. The objectives and other advantages of the invention will be realized and attained by the apparatus and method particularly pointed out in the written description and claims of this application, as well as the appended drawings.

To achieve these and other advantages, and in accordance with the purpose of the invention as embodied and broadly described herein, the invention is a narrowband twisted optical fiber WDM. The WDM comprises a twisted pair of first and second optical fibers, the twisted pair being fused together, each of the first and second fibers having a first and second end. When a first light enters the first end of the first fiber, it appears on the second end of the first fiber. In contrast, when a second light enters the first end of the first fiber, it appears on the second end of the second fiber. Similarly, when the first light enters the second end of the first fiber, it appears on the first end of the first fiber, while the second light entering the second end of the second fiber appears on the first end of the first fiber. In this WDM, for example, the first light has a wavelength of 1533 nanometers ("nm") and the second light has a wavelength of 1557 nm. The range of wavelengths for these two lights, however, can be anywhere between 1200 and 1700 nm. The isolation between the first and second lights is at least 3 decibels ("dB").

In another aspect, the present invention is a method for fabricating a narrowband twisted optical fiber multiplexer/demultiplexer ("WDM"). The WDM has two optical fibers, each having a first and second end and a core surrounded by a cladding. The two fibers are twisted about one another to create a twisted pair. Two lights are selected, each having a different wavelength. The first end of the first optical fiber is then illuminated with the first light. Then the twisted pair is heated while being simultaneously axially stretched through a predetermined draw distance. The first and second lights have wavelengths in the range of 1400 nm to 1600 nm. The predetermined draw distance is in the range of 10 millimeters ("mm") to 30 mm. The first light appears on the second end of the first fiber, while the second light appears on the second end of the second fiber, the two lights having an isolation of at least 3 dB.

It is to be understood that both the foregoing general description and the following detailed description are exemplary and explanatory only and are not restrictive of the invention, as claimed.

The accompanying drawings are included to provide a further understanding of the invention and are incorporated in and constitute a part of this specification, to illustrate the embodiments of the invention, and, together with the description, to explain the principles of the invention.

DETAILED DESCRIPTION OF THE INVENTION

Reference will now be made in detail to the present preferred embodiment of the invention, an example of which is illustrated in the accompanying drawings. Wherever possible, the same reference numbers will be used throughout the drawings to refer to the same or like parts.

In accordance with the present invention, an apparatus and method are provided for a narrowband twisted optical fiber wavelength-division multiplexer/demultiplexer (or "WDM"). In the remainder of this description, the term WDM will be used interchangeably for uni-directional WDMs that can either multiplex or demultiplex only, and for bi-directional WDMs that can both multiplex and demultiplex. The apparatus includes a twisted pair of first and second optical fibers that are fused together, each of which has a first and second end and a core surrounded by a cladding.

Figure 1A:
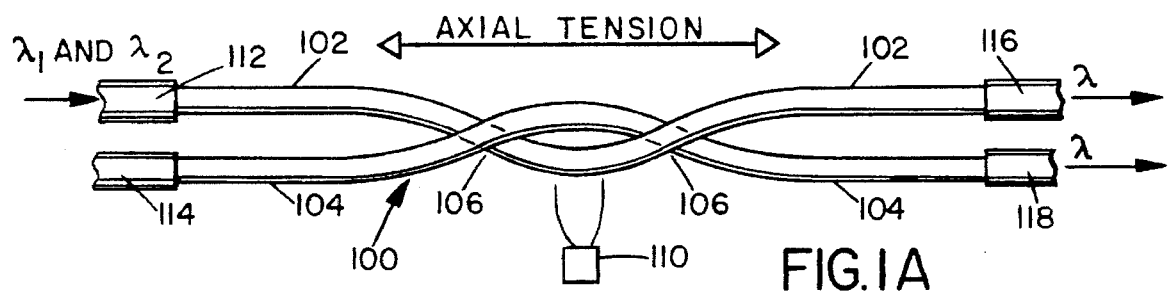
FIG. 1A shows two twisted optical fibers before being fused by simultaneously stretching and heating the fibers.
Figure 1B:
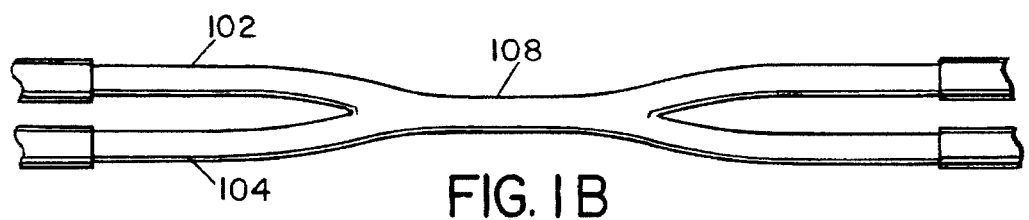
FIG. 1B illustrates fused twisted fibers.

An exemplary embodiment of the narrowband twisted optical fiber WDM of the present invention is shown in FIGS. 1A and 1B and is designated generally by reference numeral 100. The apparatus includes a first optical fiber 102 and a second optical fiber 104. The first fiber 102 has a first end 112 and a second end 116, while the second fiber 104 has a first end 114 and a second end 118. In the process of fabricating the narrowband WDM of the present invention (the process being described below), a first light ($\lambda_1$) is input either to the first end 112 of the first fiber 102 or to the first end 114 of the second fiber 104. If the first fiber 102 is used, the second end 116 of the first fiber 102 is then monitored to determine whether $\lambda_1$ is emanating from the second end 116, or if the second fiber 104 is used, the second end 118 of the second fiber 104 is monitored to determine whether $\lambda_1$ is emanating from the second end 118. Alternatively, two lights ($\lambda_1$ and $\lambda_2$) may be input to one of the first ends 112, 114, the second ends 116, 118 being monitored to determine whether $\lambda_1$ is emanating from the second end 116 of the first fiber 102 and whether $\lambda_2$ is emanating from the second end 118 of second fiber 104.

The two optical fibers 102, 104 are twisted about one another, as indicated by reference numeral 106. These twisted optical fibers are then heated with a heat source 110 (preferably a torch) and stretched by means of axial tension, as illustrated in FIG. 1A. After heating and stretching, the optical fibers become fused together, as shown in FIG. 1B, forming a fused biconical tapered optical coupler. Reference numeral 108 indicates the area of fusion of the two optical fibers 102, 104.

Figure 2A:
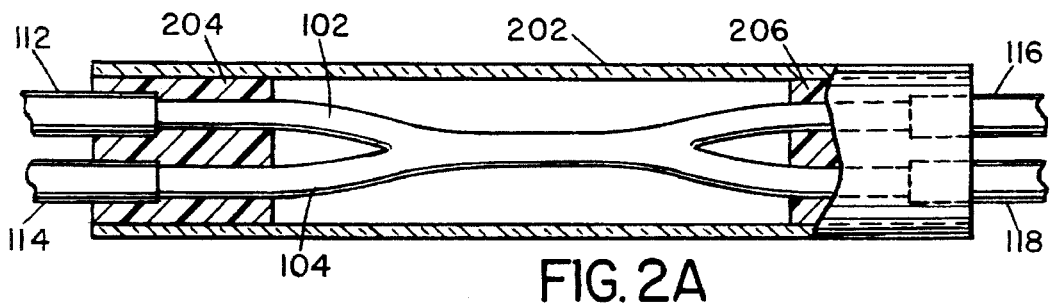
FIGS. 2A–2C illustrate the fused twisted fibers in a package form, where the fibers are covered with various protective materials.
Figure 2B:
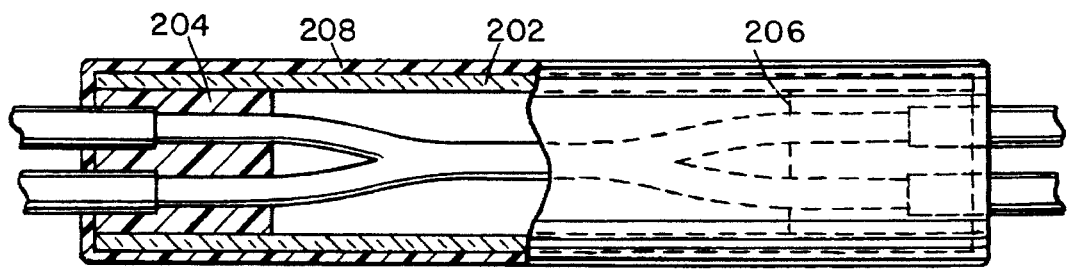

Referring now to FIG. 2A, after the optical fibers have been fused together to form a fused biconical tapered coupler, the fibers are covered with a glass substrate 202. At each end 204, 206 of the glass substrate 202, the fibers are room temperature vulcanized ("RTVed") with a mixture of epoxy and glass fumed powders. Preferably, the epoxy is 353 ND manufactured by Epoxy Technology, Inc., located at 14 Fortune Drive, Billerica, Mass. 01821. The glass substrate 202 and the RTVed ends 204, 206 are in turn covered by a heat shrink tubing 208, as illustrated in FIG. 2B. This tubing 208 prevents particles from entering into the fused region; it also reduces shock, thereby minimizing breakage of the fused coupled fibers. Specifically, the heat shrink tubing 208 may be a teflon, which is acid and moisture resistant. With the tubing in place, the result is a complete WDM package.

Figure 2C:
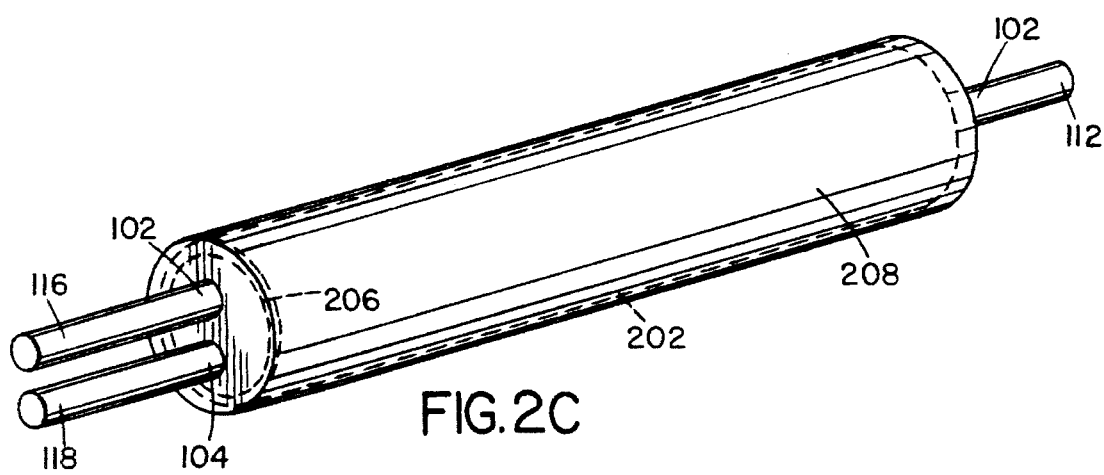

FIG. 2C illustrates one form of a completed twisted fiber optic WDM. In this completed WDM, the first end 114 of the second fiber 104 is cut from the package. This is done to facilitate identification of the end of the fiber into which $\lambda_1$ and/or $\lambda_2$ were input during fabrication of the WDM (i.e., the first end 112 of the first fiber 102, as shown in FIG. 1A). Alternatively, the first end 114 of the second fiber 104 may be left intact in the completed package.

Figure 3A:
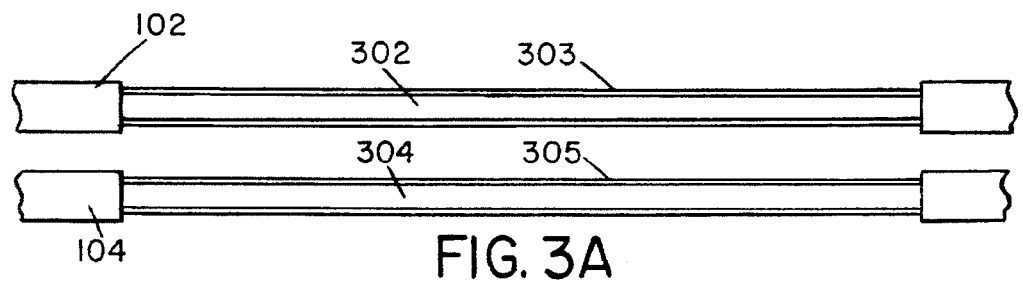
FIGS. 3A–3D illustrate the process for fabricating the narrowband twisted optical fiber WDM of the present invention.
Figure 3B:
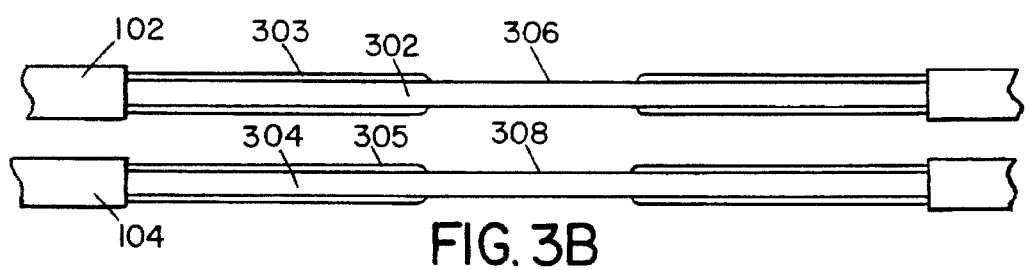

The method of fabricating the fused, twisted optical fiber WDM of the present invention will now be described and is illustrated in FIGS. 3A–3D. Referring initially to FIG. 3A, the first and second optical fibers 102, 104, respectively, are selected, the first fiber 102 having a core 302 and a cladding 303 surrounding the core 302, and the second fiber 104 having a core 304 and a cladding 305 surrounding the core 304. As shown in FIG. 3B, before fusing the two optical fibers 102, 104, each can be etched to remove a portion (or all) of the cladding 303, 305, the etched regions being indicated by reference numerals 306, 308. Either or both fibers 102, 104 may be etched over a certain distance, the distance being substantially the same for each fiber. Alternatively, only one of the fibers 102, 104 can be etched, leaving the cladding intact on the other. It is preferred, however, that neither fiber 102 or 104 is etched to remove the claddings 303, 305. Instead, preferably only a buffer layer (not shown) that surrounds the claddings 303, 305 is removed before fusing the fibers.

First and second lights are selected, each having a different wavelength, $\lambda_1$ and $\lambda_2$. For example, $\lambda_1$ and $\lambda_2$ may be 1533 nanometers ("nm") and 1577 nm; 1542 nm and 1557 nm; 1544 nm and 1557 nm; 1546 nm and 1557 nm; 1548 nm and 1557 nm; 1550 nm and 1557 nm; 1551 nm and 1557 nm; 1552 nm and 1557 nm; or 1553 nm and 1557 nm. Thus, the first and second lights are preselected and have different wavelengths. It will be apparent to those skilled in the art that other wavelength pairs may be selected. Indeed, the wavelengths of $\lambda_1$ and $\lambda_2$ may lie anywhere in the range between 1200 and 1700 nm, but preferably lie in the range between 1400 and 1600 nm.

Figure 3C:
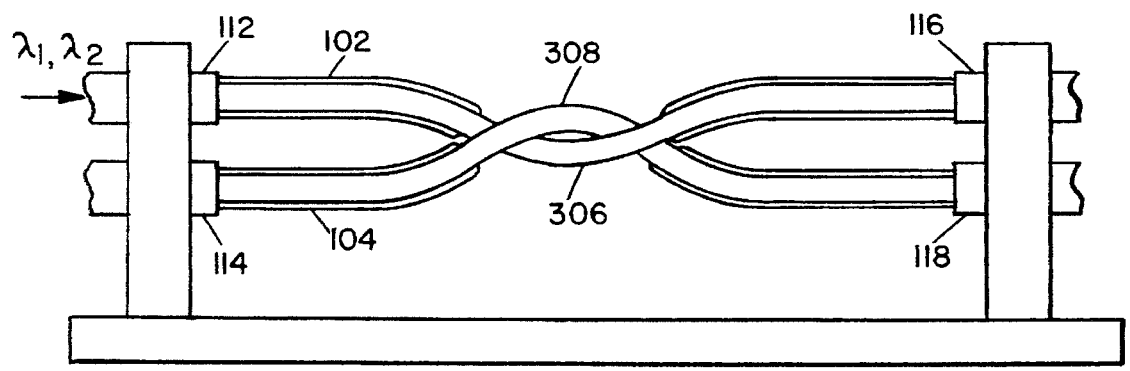

Referring now to FIG. 3C, either the first or second lights, $\lambda_1$ or $\lambda_2$, is applied to the first end 112 of the first fiber 102. Recall, however, that both lights may be input to either of the first ends 112, 114. FIG. 3C also illustrates that the etched optical fibers 102, 104 are twisted about one another. Preferably, the twist is in the range of two to four revolutions. In other words, the two fibers 102, 104 are twisted about one another in the range of 720° to 1440° of revolution. Nevertheless, the two fibers can be twisted fewer or additional revolutions, or even fractions of a full revolution. The fibers can be placed in a securing device 310 designed to fix them at both ends.

Figure 3D:
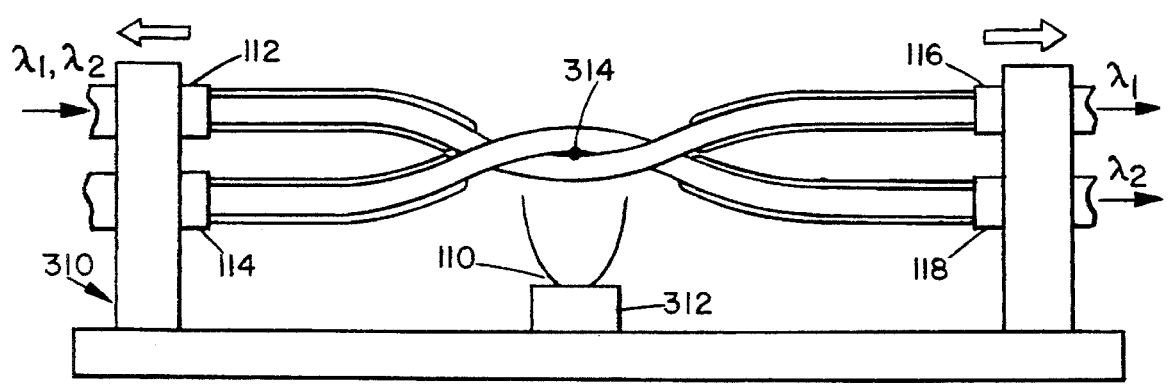

As is illustrated in FIG. 3D, with either of the two lights input to the first end 112 of the first fiber 102, axial tension is applied to the twisted pair of fibers 102, 104 (i.e., the fibers are pulled or drawn apart), while simultaneously heating the fibers using a heat source 110. A base 312 of the heat source 110 is placed a certain distance from a midpoint 314 of the fibers. The distances between the two fibers 102, 104 and the between the heat source 110 and the midpoint 314 are exaggerated in FIG. 3D. As those skilled in the art will appreciate, the two fibers are very close together relative to the distance between the midpoint 314 and the heat source 110. The securing device 310 is used to hold the fibers during the application of axial tension, and the twisted fibers are drawn apart at a certain velocity while being heated. Preferably, the velocity is in the range of 30 microns/second to 150 microns/second.

The heat source 110 may be a stainless steel or ceramic (or other suitable material), cylindrical torch placed an appropriate distance away from the midpoint 314. Alternatively, the heat source 110 may be a laser (e.g., a $CO_2$ laser) or other suitable heat source. As embodied herein, a base 312 of the torch 110 will be placed in the range of 2.5 millimeters ("mm") to 3.5 mm away from the twisted fibers. The torch 110 may have a cylindrical shaped output, the cylinder including an outside diameter in the range of 17.3 mm to 21.3 mm, an inside diameter in the range of 1 mm to 20 mm, and a length in the range of 10.2 mm to 15.2 mm. A rectangular, square, or oval torch may also be used that has a width or loci similar to the diameters listed above.

During the heating and pulling process, the output of the input light (either $\lambda_1$ or $\lambda_2$) is monitored. In the finalized package, for the demultiplexing function, it is intended that the first light, $\lambda_1$, will be output on the second end 116 of the first fiber 102, and the second light, $\lambda_2$, will be output on the second end 118 of the second fiber 104. For the multiplexing function, on the other hand, it is intended that both $\lambda_1$ and $\lambda_2$ will be output on the first end 112 of the first fiber 102, if $\lambda_1$ is input to the second end 116 of the first fiber 102 and $\lambda_2$ is input to the second end 118 of the second fiber 104. Accordingly, the second end 116 of the first fiber 102 may be monitored during the heating and pulling process to determine whether $\lambda_1$ (or $\lambda_2$) is in fact being output from the second end 116.

Figure 4:
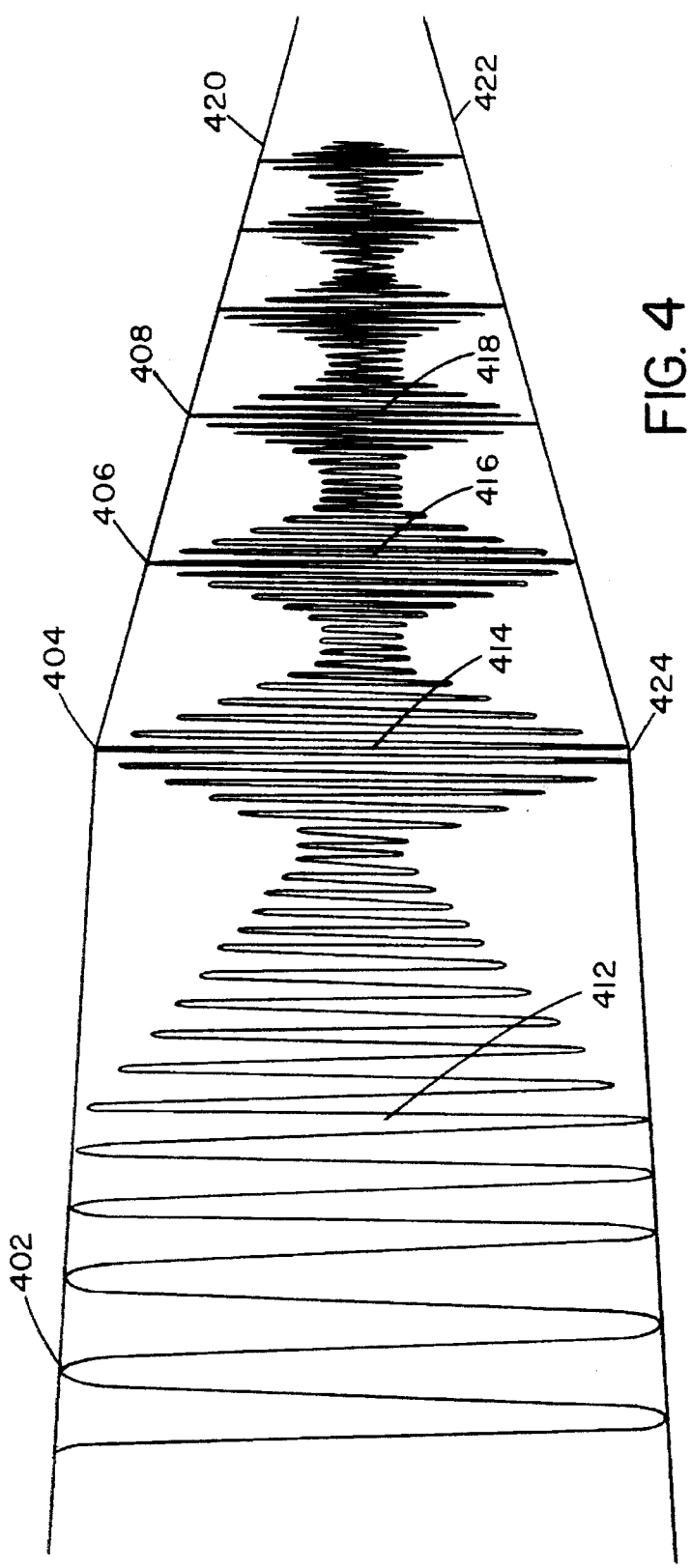
FIG. 4 is a graphical representation of an exemplary waveform that is output from the narrowband twisted optical fiber WDM of the present invention.

FIG. 4 illustrates the oscillation wave envelope of the optical power for particular lights. As the twisted pair of optical fibers is drawn apart, the throughput power of the first and second lights (or signals), $\lambda_1$ and $\lambda_2$, undergoes oscillation patterns, the envelopes of these oscillations forming a particular waveform, such as the one shown in FIG. 4. That waveform has a sinusoidal wave pattern, which has several peaks indicated by reference numerals 402, 404, 406, 408. At each peak, one of the signals will reach a maximum and the other a minimum. The difference between the maximum and minimum is known as the isolation between the signals. As the isolation decreases, the signals' wavelengths will merge. Thus, the greater the isolation, the more distinct the signals. Isolation is illustrated in FIG. 4 by the distance between the two converging lines 420, 422.

A minimum amount of isolation must be maintained in any fiber optic system, whether digital or analog. In a digital system, the minimum isolation is approximately 5 decibels ("dB"). Thus, when the isolation between the two wavelengths is less than 5 dB, isolation is insufficient, because at dB levels lower than 5 dB the two lights tend to merge and thus cannot be distinguished. In accordance with the present invention, very narrowband WDMs can be fabricated while maintaining adequate isolation (i.e., at least 5 dB). In particular, a WDM can be fabricated where the wavelengths corresponding to the first and second lights are only 4.0 nm apart, with $\lambda_1$ having a wavelength of 1553 nm, and $\lambda_2$ having a wavelength of 1557 nm. For an analog system, the minimum isolation is approximately 8 dB. Nevertheless, in other systems, isolation may be as small as 3 dB; accordingly, the method of the present invention can also be used to fabricate WDMs having such small isolation levels.

Again referring to FIG. 4, as the twisted pair is drawn apart, the waveform proceeds from the first peak 402 to the second peak 404. At the second peak, for example, a 1557 nm wavelength light reaches a maximum, while a 1533 nm wavelength light reaches a minimum. The bandwidth separation between these two lights is 24 nm (i.e., 1557 nm −1533 nm=24 nm). Continuing to draw apart the twisted pair of optical fibers, at the peak of the third sinusoidal wave 406, a 1557 nm light reaches a maximum and a 1542 nm light reaches a minimum. Here, the separation is 15 nm. In principal, the drawing can be stopped anywhere along any particular waveform. The smallest bandwidth separation that can be attained while maintaining sufficient isolation of the two lights (e.g., approximately 5 dB in a digital system) is approximately 4.0 nm.

The waveform shown in FIG. 4 forms a series of wave pockets 412, 414, 416, 418, each of which has a corresponding peak 402, 404, 406, 408. Each pocket 412, 414, 416, 418 contains many sinusoidal oscillations. These oscillations reflect the optical power oscillating back and forth between the throughput fiber and the twisted pair of fused optical fibers. The more axial tension that is applied to the twisted pair (i.e., the further the pair is pulled apart), the more oscillations there will be per wave pocket. Moreover, the more the twisted pair is pulled apart, the narrower the separation will be between two adjacent oscillations. That is, the oscillations will be more closely spaced. Thus, in each succeeding pocket, more oscillations occur than in the previous pocket, and the oscillations are spaced more closely.

During the fusing process, the output of the optical fibers 300, 301 may be monitored at the second ends 318, 320 to determine the bandwidth isolation between the two adjacent wavelengths, $\lambda_1$ and $\lambda_2$. FIG. 4 shows that the farther the twisted pair is pulled apart, the less isolation there is between the two wavelengths, as can be seen by the two converging lines 420, 422. In other words, the isolation decreases as the length of the fused region and the oscillations increase.

In order to keep the whole package small, the drawing distance must be minimized. Because the number of oscillations increases as the fibers are pulled farther apart, minimizing the draw distance will reduce the number of oscillations. In turn, because the oscillations will be fewer in each wave pocket, the separation between them will be maximized. For example, it has been determined that for a WDM operating with a first light having a 1548 nm wavelength and a second light having a 1557 nm wavelength, the draw distance is in the range of 14 to 17 mm. For a 1533/1557 nm WDM, the draw distance is in the range of 15 to 18 mm. A 1542/1557 nm WDM requires a draw distance in the range of 16 to 18 mm, while a 1546/1557 nm WDM has a draw distance in the range of 17 to 20 mm. Finally, a 1553/1557 nm WDM (that is, a WDM operating with 4.0 nm of separation), the draw distance is in the range of 20 to 23 mm. The torch 110 typically uses a hydrogen-air diffusion flame, creating an inhomogeneous temperature flame. A premixed flame, e.g., hydrogen-oxygen, can also be used.

In accordance with the present invention, a predetermined draw distance or pull length "L" is used to determine at what point to cease pulling apart the twisted fibers. This draw distance, L, is predetermined by measuring the distance the fibers are pulled apart to attain a maximum 402, 404, 406, 408 (or alternatively a minimum) along a waveform such as the one shown in FIG. 4. For example, fibers are pulled apart to determine the draw distance ($L_{PD}$) at the second maximum 404, which maximum corresponds to a particular wavelength, $\lambda_{PD}MAX$. When $\lambda_{PD}MAX$ is selected as the light to be input to the first end 112 in fabricating a WDM, the twisted fibers are pulled apart $L_{PD}$. This creates a WDM that can multiplex and/or demultiplex signals having wavelengths $\lambda_{PD}MAX$ and $\lambda_{PD}MIN$, the latter signal being the wavelength that reaches a minimum level 424 corresponding to the maximum 404.

The number of oscillations has also been determined for several WDMs. For example, a 1533/1557 nm WDM will have between 60 and 68 oscillations, a 1552/1557 nm WDM will have between 90 and 110 oscillations, a 1546/1557 nm WDM will have between 134 and 154 oscillations, and a 1553/1557 nm will have between 316 oscillations and 376 oscillations.

Of course, with the present invention, uni-directional or bi-directional WDMs can be fabricated. That is, WDMs can be fabricated that only multiplex or demultiplex, or that multiplex and demultiplex. The choice is dictated by design considerations and the requirements of the particular system for which the WDM is being fabricated.

Figure 5:
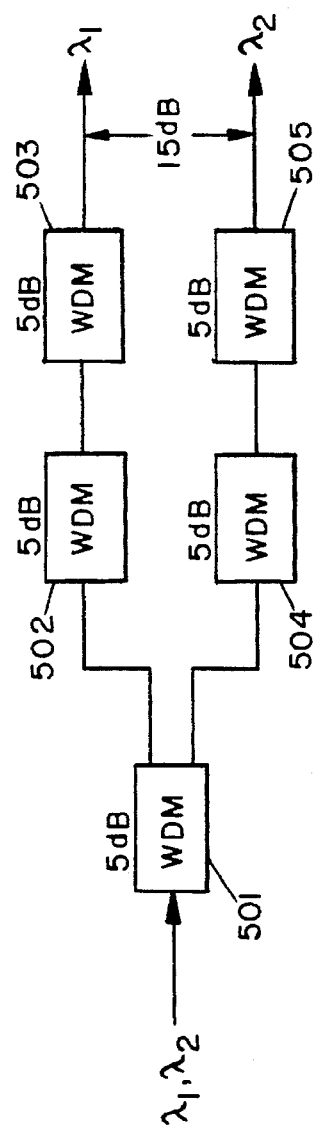
FIG. 5 is a diagrammatical representation of concatenated WDMs.

To obtain additional isolation between the two wavelengths, WDMs can be concatenated. For example, as illustrated in FIG. 5, five WDMs 501, 502, 503, 504, 505, each attaining 5 dB of isolation, can be concatenated to obtain 15 dB of isolation between $\lambda_1$ and $\lambda_2$ at the ultimate output. As will be readily apparent to those skilled in the art, WDMs can be concatenated in a variety of ways to obtain the necessary isolation.

It will be apparent to those skilled in the art that various modifications and variations can be made in the apparatus and method of the present invention without departing from the spirit or scope of the invention. Thus, it is intended that the present invention cover the modifications and variations of this invention, provided they come within the scope of the appended claims and their equivalents.

What is claimed is:

1. A narrowband twisted optical fiber wavelength division multiplexer/demultiplexer ("WDM"), comprising:

a twisted pair of fused first and second optical fibers having a twist midpoint, each of said first and second optical fibers having an unetched core and an unetched cladding surrounding said core and having a first and a second end, said first and second optical fibers having a length and a diameter that are substantially the same, said twisted pair being heated by a heat source and simultaneously axially stretched by a pair of fiber securing devices over a predetermined total draw distance to fuse said twisted pair together, said pair of fiber securing devices moving in an opposite direction from one another, said optical fibers being twisted to facilitate fusing, said heat source being maintained in substantially the same position relative to said twist midpoint while said twisted pair is being heated and axially stretched;

wherein a first light entering said first end of said first fiber appears on said second end of said first fiber and a second light entering said first end of said first fiber appears on said second end of said second fiber;

wherein said first light entering said second end of said first fiber appears on said first end of said first fiber and said second light entering said second end of said second fiber appears on said first end of said first fiber;

wherein said first light has a first wavelength and said second light has a second wavelength, said first wavelength being different from said second wavelength, and said first and second wavelengths being in the range of 1400 nanometers ("nm") to 1600 nm; and wherein said first and second lights have an isolation of at least 3 dB.

2. The narrowband twisted optical fiber WDM recited in claim 1 wherein said first wavelength is approximately 1533 nm and said second wavelength is approximately 1577 nm.

3. The narrowband twisted optical fiber WDM recited in claim 2 wherein the first and second lights each have an oscillation wave envelope of optical power, each said oscillation wave envelope having a plurality of oscillations, said plurality of oscillations being in a range of 19 to 23.

4. The narrowband twisted optical fiber WDM recited in claim 1 wherein said first wavelength is approximately 1542 nm and said second wavelength is approximately 1557 nm.

5. The narrowband twisted optical fiber WDM recited in claim 4 wherein the first and second lights each have an oscillation wave envelope of optical power, each said oscillation wave envelope having a plurality of oscillations, said plurality of oscillations being in a range of 60 to 68.

6. The narrowband twisted optical fiber WDM recited in claim 1 wherein said first wavelength is approximately 1544 nm and said second wavelength is approximately 1557 nm.

7. The narrowband twisted optical fiber WDM recited in claim 1 wherein said first wavelength is approximately 1546 nm and said second wavelength is approximately 1557 nm.

8. The narrowband twisted optical fiber WDM recited in claim 7 wherein the first and second lights each have an oscillation wave envelope of optical power, each said oscillation wave envelope having a plurality of oscillations, said plurality of oscillations being in a range of 134 to 154.

9. The narrowband twisted optical fiber WDM recited in claim 1 wherein said first wavelength is approximately 1548 nm and said second wavelength is approximately 1557 nm.

10. The narrowband twisted optical fiber WDM recited in claim 1 wherein said first wavelength is approximately 1550 nm and said second wavelength is approximately 1557 nm.

11. The narrowband twisted optical fiber WDM recited in claim 1 wherein said first wavelength is approximately 1551 nm and said second wavelength is approximately 1557 nm.

12. The narrowband twisted optical fiber WDM recited in claim 1 wherein said first wavelength is approximately 1552 nm and said second wavelength is approximately 1557 nm.

13. The narrowband twisted optical fiber WDM recited in claim 1 wherein said first wavelength is approximately 1553 nm and said second wavelength is approximately 1557 nm.

14. The narrowband twisted optical fiber WDM recited in claim 13 wherein the first and second lights each have an oscillation wave envelope of optical power, each said oscillation wave envelope having a plurality of oscillations, said plurality of oscillations being in the range of 316 to 376.

15. The narrowband twisted optical fiber WDM recited in claim 1 wherein the first and second lights are each an analog signal; and wherein the isolation is at least 8 dB.

16. The narrowband twisted optical fiber WDM recited in claim 1 wherein the first and second fibers are twisted about one another a minimum of one revolution or 360 degrees.

17. The narrowband twisted optical fiber WDM recited in claim 1 wherein the first and second fibers are twisted about one another in the range of two revolutions or 720 degrees to four revolutions or 1440 degrees.

18. A method for fabricating a narrow band optical fiber wavelength division multiplexer/demultiplexer ("WDM"), said WDM operating with a first light having a first wavelength and a second light having a second wavelength that is different from said first wavelength, said first and second wavelengths being in a range of 1400 nanometers ("nm") to 1600 nm, said method comprising:

selecting a first optical fiber and a second optical fiber of substantially the same length and diameter, each said first and second optical fiber having a core and a cladding surrounding said core, said core and said cladding both being unetched;

twisting said first and second optical fibers about one another to create a twisted pair of optical fibers to facilitate fusing said optical fibers together, said twisted pair having a twist midpoint;

heating said twisted pair of optical fibers by a heat source and simultaneously axially stretching said first and second optical fibers by a pair of fiber securing devices moving in an opposite direction from one another, thereby fusing said twisted pair of optical fibers together;

maintaining said heat source in substantially the same position relative to said twist midpoint while said twisted pair is being heated and axially stretched; and stopping said heating and stretching of said twisted pair of optical fibers at a predetermined total draw distance, thereby forming said narrow band optical fiber WDM.

19. The method recited in claim 18 wherein the predetermined draw distance has a range of 14 mm to 17 mm when the first wavelength is approximately 1548 nm and the second wavelength is approximately 1557 nm.

20. The method recited in claim 18 wherein the predetermined draw distance has a range of 15 mm to 18 mm when the first wavelength is approximately 1533 nm and the second wavelength is approximately 1557 nm.

21. The method recited in claim 18 wherein the predetermined draw distance has a range of 16 mm to 19 mm when the first wavelength is approximately 1542 nm and the second wavelength is approximately 1557 nm.

22. The method recited in claim 18 wherein the predetermined draw distance has a range of 17 mm to 20 mm when the first wavelength is approximately 1546 nm and the second wavelength is approximately 1557 nm.

23. The method recited in claim 18 wherein the predetermined draw distance has a range of 20 mm to 23 mm when the first wavelength is approximately 1553 nm and the second wavelength is approximately 1557 nm.

24. The method recited in claim 18 wherein the heating step includes placing a torch at a heating distance away from the twisted pair of optical fibers, said heating distance being in a range of 2.0 mm to 4.0 mm.

* * * * *